2,746,956
METHOD OF SILYLATING ORGANIC COMPOUNDS

John L. Speier, Pittsburgh, Pa., assignor to Dow Corning Corporation, Midland, Mich., a corporation of Michigan No Drawing. Application June 16, 1953,
Serial No. 362,133

4 Claims. (Cl. 260—210)

This invention relates to a method of preparing organosilicon esters of organic compounds.

One of the difficulties which has been encountered in the use of certain biologically active materials, such as antibiotics and blood anticoagulants, has been the fact that these compounds are excreted from the body so rapidly that their effects are of relatively limited duration. Many attempts have been made to slow down the excretion of these materials. For example, the drugs have been dispersed in a carrier and the dispersion thereafter injected into the body. This method suffers from the disadvantage that the carrier often produces undesirable effects. Furthermore, it necessitates the injection of larger amounts of material than would otherwise be necessary.

Another undesirable property of some antibiotics is their bad taste. This is particularly disadvantageous when the material is given orally to children. The problem is not satisfactorily solved by incapsulating the drug since children will often bite into the capsule. It would be highly desirable, therefore, to have some method of modifying a drug so as to render it tasteless without destroying its biological activity.

It is the object of this invention to provide a commercially feasible method of silylating organic compounds containing functional groups. A further object of this invention is to provide a method of silylating biologically active materials under conditions which do not destroy their activity. Another object is to provide a feasible method of changing undesirable properties of biologically active compounds without destroying their desirable properties. Other objects and advantages will be apparent from the following description.

In accordance with this invention, an organic compound containing at least one functional group of the formula —XH or —XM, where X is oxygen or sulfur and M is a metal, is reacted with a mixture of a chlorosilane of the formula R₃SiCl and a hexaorganodisilazane of the formula (R₃Si)₂NH whereby a silylated derivative of the organic compound is obtained. The relative proportion of the chlorosilane and the silazane is such as to maintain the reaction mixture in a neutral condition throughout the reaction. Thus, there shall be at least enough of an equimolar mixture of the chlorosilane and the silazane to react with the desired amount of active hydrogen in the organic compound.

The term "active hydrogen" as employed herein refers to the hydrogen in the —XH groups and in any water of hydration.

The silylating reactions involved in the method of this invention may be represented schematically as follows:

(1) $-XH + R_3SiCl = -XSiR_3 + HCl$
(2) $-XH + (R_3Si)_2NH = XSiR_3 + NH_3$
(3) $-XM + R_3SiCl = -XSiR_3 + MCl$

Reactions 1 and 2 occur simultaneously whenever a mixture of the chlorosilane and silazane are brought into contact with a compound having active hydrogen. Thus, if all of the functional groups in the organic compound are —XH groups, the compound must be reacted with an equimolar mixture of the chlorosilane and the silazane, if a neutral condition is to be maintained. In those cases where some of the functional groups are —XH and the others are —XM, a somewhat different condition prevails.

It can be seen from reaction 3 supra that only the chlorosilane reacts with —XM groups and that the byproduct is a salt. For these reasons, in those organic compounds where both types of functional groups exist, it is not essential that an equimolar mixture of chlorosilane and the silazane be employed. Rather, the silazane need be employed only in amount sufficient to neutralize the HCl evolved (i. e., ½ mol of silazane per mol of —XH groups). The chlorosilane, on the other hand, may be employed in molar excess of the silazane and in amount sufficient to react with all of the —XM groups.

A similar situation exists where the functional group in the organic compound is a hydrated salt. In such a case, there must be a sufficient amount of an equimolar mixture of chlorosilane and silazane to react with all of the active hydrogen in the water (i. e., at least one mol of each per mol of water). A molar excess of chlorosilane (relative to silazane) may be employed to react with the —XM groups.

It should be understood that if desired, an equimolar mixture of the chlorosilane and silazane can be employed in all of the reactions within the scope of this invention. Furthermore, the process of this invention is equally adaptable to either partial or complete silylation of the organic compound. Thus, the proportion of the mixture of silazane and chlorosilane relative to the organic compound is not critical but may be varied depending upon the degree of silylation desired.

The reaction of this invention takes place spontaneously upon mixing the reactants. In some cases, however, it is advantageous to warm the mixture. In general, heating at a temperature below 100° C. is sufficient. The reaction goes either with or without a solvent although solvents such as benzene, toluene and pyridine may be employed if desired.

The organosilicon compounds within the scope of this invention are chlorosilanes of the formula R₃SiCl and silazanes of the formula (R₃Si)₂NH where R is of the group alkyl radicals of less than 7 carbon atoms and phenyl radicals. Preferably, no more than 2 phenyl groups should be substituted on any one silicon atom. Specific examples of silanes which are operative are trimethylchlorosilane, phenyldimethylchlorosilane, triethylchlorosilane, amyldimethylchlorosilane, hexamethyldisilazane, symmetrical diphenyltetramethyldisilazane, 1 - methyl - 1,1 - dibutyl - 3 - phenyl - 3,3 - dimethyl-disilazane

and hexa-amyldisilazane.

This invention includes within its scope any organic compound containing at least one of the above defined functional groups. Thus, for example, any organic compound containing one or more of or any combination of the following groups is operative herein; hydroxyl, carboxyl, sulfonic acid (—SO₂OH), bisulphate (—OSO₂OH), sulfhydryl (—SH), sulfamic acid (—NHSO₂OH), thioacidic (—COSH) and the metal salts of any compound containing these groups. In other words, this invention includes organic compounds such as carboxylic acids, mercaptans, alcohols, sulfonic acids, phenols, sulphate esters, phosphate esters, phosphonic acids, phosphonous acids, phosphinous acids and salts thereof. The organic compounds may also contain other groups such as amide, ester, nitrile, halogen, nitro and carbonyl groups and/or it may contain, for example, sulfide, acetal, ester, ether, C=C and C≡C linkages.

The method of this invention is useful for modifying biologically active compounds. The silylated materials readily hydrolyzed when subjected to moisture thereby regenerating the original organic compound. The by-product of hydrolysis is a hexaorganodisiloxane which is essentially biologically inert and hence is not objectionable.

The primary advantages of the present method lie in the fact that the reaction mixture is always neutral and in the fact that the reaction can be successfully carried out in the presence of water. Since the reaction mixture is always neutral, the method is applicable to compounds which are sensitive to either acids or bases or both. Because the reaction can be carried out in the presence of water, it can be successfully employed with hydrated salts. This obviates the necessity and expense of removing water of hydration before silylating the compounds. Another advantage lies in the fact that the by-products are held to a minimum and are easily removed by filtration.

The following examples are illustrative only and should not be construed as limiting the invention which is properly delineated in the appended claims:

Example 1

The sodium salt of heparin, a complex polysaccharide, contains 5 alcoholic hydroxyl groups, 2 carboxyl groups, 2 sodium sulfonamide groups and 3 sodium sulphate groups (OSO$_2$ONa) per unit weight. The empirical formula is C$_{24}$H$_{32}$O$_{32}$N$_2$S$_5$Na$_5$.

.985 g. of the sodium salt of heparin, 10 ml. of hexamethyldisilazane, 5 ml. of trimethylchlorosilane and 10 ml. of pyridine were mixed and stirred for 5 days. The prolonged stirring was needed because both the sodium salt of heparin and the trimethylsilylated product are insoluble in the reaction mixture. After five days the silylated heparin and the NaCl formed during the reaction were filtered off, washed with ether and dried. 1.6 g. of a mixture of silylated heparin and NaCl was obtained. The mixture had a neutral equivalent of 336. The calculated neutral equivalent is 311 based on the weight of silylated heparin having 12 trimethylsilyl groups per formula weight plus the theoretical weight of NaCl based on 5 sodium atoms per formula weight. The equivalent weight indicates that all of the functional groups had been silylated during reaction.

It was found that when injected into a dog, the silylated heparin prevented clotting of the blood for a substantially longer period of time than an equal amount of non-silylated sodium salt of heparin.

Example 2

10 g. of the potassium salt of penicillin G containing one mol of water of hydration was suspended in 100 cc. of absolute ether and reacted with a mixture of 3 cc. of trimethylchlorosilane and 10 cc. of an equimolar mixture of trimethylchlorosilane and hexamethyldisilazane. The mixture was stirred for one hour, filtered and washed with acetone. The acetone solution was evaporated to dryness to give 10.04 g. of a glass-like solid having a neutral equivalent of 418.7. The calculated neutral equivalent is 406.5 based upon one trimethylsilyl group per penicillin molecule. The activity of the penicillin was not reduced by the above treatment.

Example 3

The organic material employed in this example was the antibiotic erythromycin sold by Eli Lilly Company under the name "Ilotycin." The structure of erythromycin is not known but the material has a molecular weight of about 736. The form employed in this example contained from 2 to 3 per cent by weight water.

11 g. of erythromycin (.05 mol+.21 mol water) was dissolved in 130 ml. of benzene and 9 g. of an equimolar mixture of hexamethyldisilazane and trimethylchlorosilane were added thereto. The solution was heated on a steam bath until no more ammonium chloride precipitated. The solution stood overnight and was then filtered to remove ammonium chloride. The solvent was removed at reduced pressure under anhydrous conditions whereupon a white powder was obtained. This material was found upon analysis to contain 5.62 per cent by weight silicon which corresponds to about 2 trimethylsilyl group per molecule of erythromycin.

The silylated material was tasteless but retained its antibiotic activity. Unsilylated erythromycin has a bitter taste which is worse than quinine.

Example 4

100 g. of 2(p-chloro-alpha-methylbenzyl)-4-chlorophenol

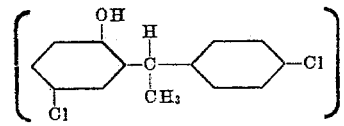

was reacted with 42 g. of an equimolar mixture of hexamethyldisilazane and trimethyl chlorosilane. The materials were shaken and then allowed to stand overnight. The resulting product was filtered and distilled to give 116 cc. of the material having the formula

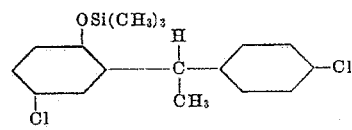

This compound has the following properties: $n_D^{25}$ 1.5510, $d_4^{25}$ 1.139 and a specific refraction of .2801.

Example 5

22.2 g. of allyl mercaptan and 17.8 g. of an equimolar mixture of hexamethyldisilazane and trimethylchlorosilane were mixed and shaken and then allowed to stand for 2 days. The mixture was filtered free of ammonium chloride and distilled to give the product (CH$_3$)$_3$SiSCH$_2$CH=CH$_2$, B.P. 150° C. at 740 mm.

Example 6

Results equivalent to those shown in the above examples are obtained when an equimolar mixture of phenyldimethylchlorosilane and diamyltetramethyldisilazane is employed as a silylating agent.

That which is claimed is:

1. A method of silylating organic compounds which comprises reacting an organic compound containing at least one functional group selected from the group consisting of groups of the formulae −XH and −XM, where X is selected from the group consisting of oxygen and sulfur and M is a metal, there being present in said organic compound at least some XH groups, with a mixture of a chlorosilane of the formula R$_3$SiCl and a silazane of the formula (R$_3$Si)$_2$NH, in which chlorosilane and silazane each R is selected from the group consisting of alkyl radicals of less than 7 carbon atoms and phenyl radicals, the relative amounts of the chlorosilane and the silazane in said reaction being such that there is at least enough of an equimolar mixture of the chlorosilane and silazane to react with the desired amount of active hydrogen in the organic compound and to maintain the reaction mixture in a neutral condition throughout the reaction.

2. A method in accordance with claim 1 wherein each R is methyl.

3. A method of silylating an organic compound which comprises reacting an organic compound containing at least one functional group selected from the group consisting of groups of the formulae –XH and –XM, where X is selected from the group consisting of oxygen and sulfur and M is a metal, there being present in said organic compound at least some XH groups, with an equimolar mixture of a chlorosilane of the formula $R_3SiCl$ and a silazane of the formula $(R_3Si)_2NH$, in which chlorosilane and silazane each R is selected from the group consisting of alkyl radicals of less than 7 carbon atoms and phenyl radicals, whereby the reaction mixture is maintained in a neutral condition throughout the reaction.

4. A method in accordance with claim 3 wherein each R is methyl.

References Cited in the file of this patent

UNITED STATES PATENTS

| | | |
|---|---|---|
| 2,567,110 | Hyde | Sept. 4, 1951 |
| 2,590,039 | Richter | Mar. 18, 1952 |
| 2,611,780 | Speier | Sept. 23, 1952 |
| 2,626,272 | Speier | Jan. 20, 1953 |

FOREIGN PATENTS

| | | |
|---|---|---|
| 138,357 | Sweden | Sept. 25, 1952 |